United States Patent [19]
Yuzawa et al.

[11] Patent Number: 5,265,443
[45] Date of Patent: Nov. 30, 1993

[54] REFRIGERATING UNIT

[75] Inventors: Jiro Yuzawa, Ohra; Kazuo Takemasa, Ohta; Katuhiko Inoue; Fukuji Yoshida, both of Ohra; Yutaka Ohmori, Ohta, all of Japan

[73] Assignee: Sanyo Electric Co., Ltd., Osaka, Japan

[21] Appl. No.: 889,529

[22] Filed: May 27, 1992

[30] Foreign Application Priority Data

May 28, 1991 [JP] Japan ................................. 3-123904

[51] Int. Cl.$^5$ ............................................. F25B 1/00
[52] U.S. Cl. ...................................... 62/498; 62/114; 252/67
[58] Field of Search .................... 62/114, 498; 252/67

[56] References Cited
U.S. PATENT DOCUMENTS

| | | | |
|---|---|---|---|
| 3,733,845 | 5/1973 | Lieberman | 62/335 |
| 4,468,337 | 8/1984 | Ramet et al. | 252/67 |
| 4,788,829 | 12/1988 | Takemasa et al. | 62/335 |
| 4,957,652 | 9/1990 | Tamura et al. | 252/67 |
| 4,978,467 | 12/1990 | Shankland et al. | 252/69 |
| 5,038,571 | 8/1991 | Yokouchi et al. | 62/114 |
| 5,092,138 | 3/1992 | Radermacher et al. | 62/114 |

FOREIGN PATENT DOCUMENTS

| | | |
|---|---|---|
| 0271989 | 5/1973 | European Pat. Off. . |
| 0419042 | 3/1991 | European Pat. Off. . |
| 3521060 | 12/1985 | Fed. Rep. of Germany . |
| 2095865 | 2/1972 | France . |
| 3-088889 | 4/1991 | Japan . |
| 3-260557 | 11/1991 | Japan . |
| 2180921 | 4/1987 | United Kingdom . |

*Primary Examiner*—Ronald C. Capossela
*Attorney, Agent, or Firm*—Weingarten, Schurgin, Gagnebin & Hayes

[57] ABSTRACT

The present invention provides a refrigerating unit comprising a high temperature side refrigerant circuit (2) and a low temperature side refrigerant circuit (3) for forming an independent refrigerant closed-circuit (3) for forming an independent closed-circuit which exhibits a refrigerating effect by that a refrigerant discharged from each compressor (4) and (10) is condensed and then is evaporated, and an evaporator (14) of the high temperature side refrigerant circuit (2) and a condenser (23) of the low temperature side refrigerant circuit (3) form a thermal exchanger (25), wherein a non-azeotropic mixture refrigerant comprising; (a) an inorganic refrigerant selected from the group consisting of argon and nitrogen, (b) a hydrocarbon which makes (a) component liquidize, and (c) at least one refrigerant selected from the group consisting of hydrochlorofluorocarbon, hydrofluorocarbon, hydrocarbon and fluorocarbon, which makes (b) component liquidize, is sealed into the low temperature side refrigerant circuit (3). Preferably, (a) component of said non-azeotropic mixture refrigerant is argon, (b) component of said non-azeotropic mixture refrigerant is methane and (c) component of said non-azeotropic mixture refrigerant is a mixture of dichlorofluoromethane, tetrafluoromethane, (d) component selected from the group consisting of chlorodifluoromethane, difluoromethane and pentafluoroethane, and (e) component which is trifluoromethane and/or hexafluoroethane.

16 Claims, 1 Drawing Sheet

REFRIGERATING UNIT

BACKGROUND OF THE INVENTION

1. Field of the Invention

The present invention relates to a refrigerating unit of a binary refrigerating system comprising independent dual refrigerant circuit, wherein an evaporator of a high temperature side refrigerant circuit and a condenser of a low temperature side refrigerant circuit form a thermal exchanger.

2. Description of the Prior Art

The conventional binary refrigerating unit is shown in the Utility Model Publication No. 58-23101. Namely, each refrigerant circuit in the high temperature side and low temperature side comprises independent dual refrigerant closed-circuit, and an evaporator of the high temperature side refrigerant circuit and a condenser of the low temperature side refrigerant circuit form a thermal exchanger so that the refrigerant of the low temperature side refrigerant circuit is condensed by the evaporation of the refrigerant of the high temperature side refrigerant circuit. Thereby, since it is possible to use the refrigerant having lower boiling point (evaporation temperature) to the low temperature side refrigerant circuit, it is possible to obtain an extremely low temperature by the evaporator of the low temperature side refrigerant circuit.

In the above mentioned dual refrigerating system, it is possible to obtain the low temperature about $-80°$ C. in the evaporator of the low temperature side refrigerant circuit normally. However, in order to the lower temperature such as $-130°$ C., it needs to improve the structure of the refrigerant circuit and to add the various kind of modification to the sealing refrigerant composition The applicant of the present invention disclosed the above mentioned latter method, that is, the way of realizing a super low temperature of $-130°$ C. by improving the sealing refrigerant composition in the specification of the Patent Application No. 61-91599 which was filed prior to the present case.

In detail, R500 or R502 are sealed into the high temperature side refrigerant circuit and R13B1 (bromotrifluoromethane) or R503 are to the low temperature side refrigerant circuit, respectively.

However, according to the above mentioned structure, the refrigerants such as R500, R502, R13B1, and R503 are the refrigerants which are the object of a regulated flon and it has been studied to replace to the refrigerant out of the regulated immediately from the viewpoint of an environmental protection of an ozone layer destroy and so on.

On the other hand, since this refrigerating unit is mainly used for keeping an organism such as blood and an examined body for long time in a biotechnology field, the unit for realizing the lower temperature, for example, $-150°$ C. has been required from the viewpoint of the reliability.

SUMMARY OF THE INVENTION

The present invention is to solve the above problems, and the object of the present invention is to provide an excellent refrigerating unit for realizing the super lower temperature of $-150°$ C. without any usage of the refrigerant which is the object of the regulated flon and a liquid nitrogen.

As stated in the claim 1, the present invention provides a refrigerating unit comprising a high temperature side refrigerant circuit and a low temperature side refrigerant circuit for forming an independent refrigerant closed-circuit which exhibits a refrigerating effect by that a refrigerant discharged from a compressor is condensed and then is evaporated and an evaporator of said high temperature side refrigerant circuit and a condenser of said low temperature side refrigerant circuit form a thermal exchanger, wherein a non-azeotropic mixture refrigerant comprising (a) an inorganic refrigerant selected from the group consisting of argon and nitrogen, (b) a hydrocarbon which makes (a) component liquidize, and (c) at least one refrigerant selected from the group consisting of hydrochlorofluorocarbon, hydrofluorocarbon, hydrocarbon and fluorocarbon, which makes (b) component liquidize, is sealed into said low temperature side refrigerant circuit.

As stated in the claim 2, in the claim 1, (b) component of said non-azeotropic mixture refrigerant is methane.

As stated in the claim 3, in the claim 2, (a) component of said non-azeotropic mixture refrigerant is argon, (c) component of said non-azeotropic mixture refrigerant is a mixture of dichlorofluoromethane, tetrafluoromethane, (d) component selected from the group consisting of chlorodifluoromethane, difluoromethane and pentafluoroethane, and (e) component which is trifluoromethane and/o hexafluoroethane.

As stated in the claim 4, in the claim 3, the non-azeotropic mixture refrigerant comprises 3 to 13% by weight of argon, 3 to 13% by weight of methane, 0 to 32% by weight of dichlorofluoromethane, 15 to 45% by weight of tetrafluoromethane, 13 to 53% by weight of (d) component 10 to 36% by weight of (e) component.

As stated in the claim 5, in the claim 3, another non-azeotropic mixture refrigerant comprising chlorodifluoromethane, 1-chlor-1- 1-difluoroethane, and dichlorofluoromethane is sealed into said high temperature side refrigerant circuit.

As stated in the claim 6, in the claim 5, the non-azeotropic mixture refrigerant sealed into the high temperature side refrigerant circuit comprises 70% by weight of chlorodifluoromethane, 25% by weight of 1-chloro-1, 1-difluoroethane, and 5% by weight of dichlorofluoromethane.

As stated in the claim 7, in the claim 3, another non-azeotropic mixture refrigerant comprising chlorodifluoromethane, 1-chloro-1, 1-difluoroethane, octafluoropropane is sealed into the high temperature side refrigerant circuit.

As stated in the claim 8, in the claim 7, the non-azeotropic mixture refrigerant sealed into the high temperature side refrigerant circuit comprises 70% by weight of chlorodifluoromethane, 25% by weight of 1-chloro-1, 1-difluoroethane, and 5% by weight of octafluoropropane.

As stated in the claim 9, in the claim 3, octafluoropropane is added to the non-azeotropic mixture refrigerant sealed into the low temperature side refrigerant circuit.

As stated in the claim 10, in the claim 3, (d) component is chlorodifluoromethane.

As stated in the claim 11, in the claim 3, (d) component is difluoromethane.

As stated in the claim 12, in the claim 3, (d) component is pentafluoroethane.

As stated in the claim 13, in the claim 3, (e) component is a mixture of trifluoromethane and hexafluoroethane.

As stated in the claim 14, in the claim 3, (e) component is trifluoromethane.

As stated in the claim 15, in the claim 3, (e) component is hexafluoroethane.

As stated in the claim 16, in the claim 3, nitrogen is added to the non-azeotropic mixture refrigerant sealed into the low temperature side refrigerant circuit.

As mentioned above, the present invention realizes the super low temperature of −150° C. in the final step of the evaporator without any usage of the refrigerant which is the object of the regulated flon by using the difference of the evaporation temperature of each refrigerant and by condensing the refrigerant still in the vapor phase state subsequently by plural thermal exchangers. As a result of that, it is possible to cope with the problem of the ozone layer destroy and to stabilize the keeping of the organism and the examined body for long time.

Further, when dichlorofluoromethane (R21) having the high boiling point (8.95° C.) and good compatibility with an oil is sealed, it is possible to achieve a feedback to the compressor with the state of melting the oil discharged into the refrigerant circuit therein. Thereby, it is possible to prevent a circulation failure of the compressor and it is possible to evaporate R21 which is fed back to the compressor in the liquid state within the compressor, thereby making the temperature of the compressor low.

Furthermore, by sealing octafluoropropane (R218) having the low boiling point (−36.7° C.) and small degree of the ratio of specific heat (1.06), it is possible to control an increment of the discharging temperature of the compressor. Thereby, it is possible to improve the refrigerating ability and to prevent an oil sludge and an oil deterioration.

Figure 1:
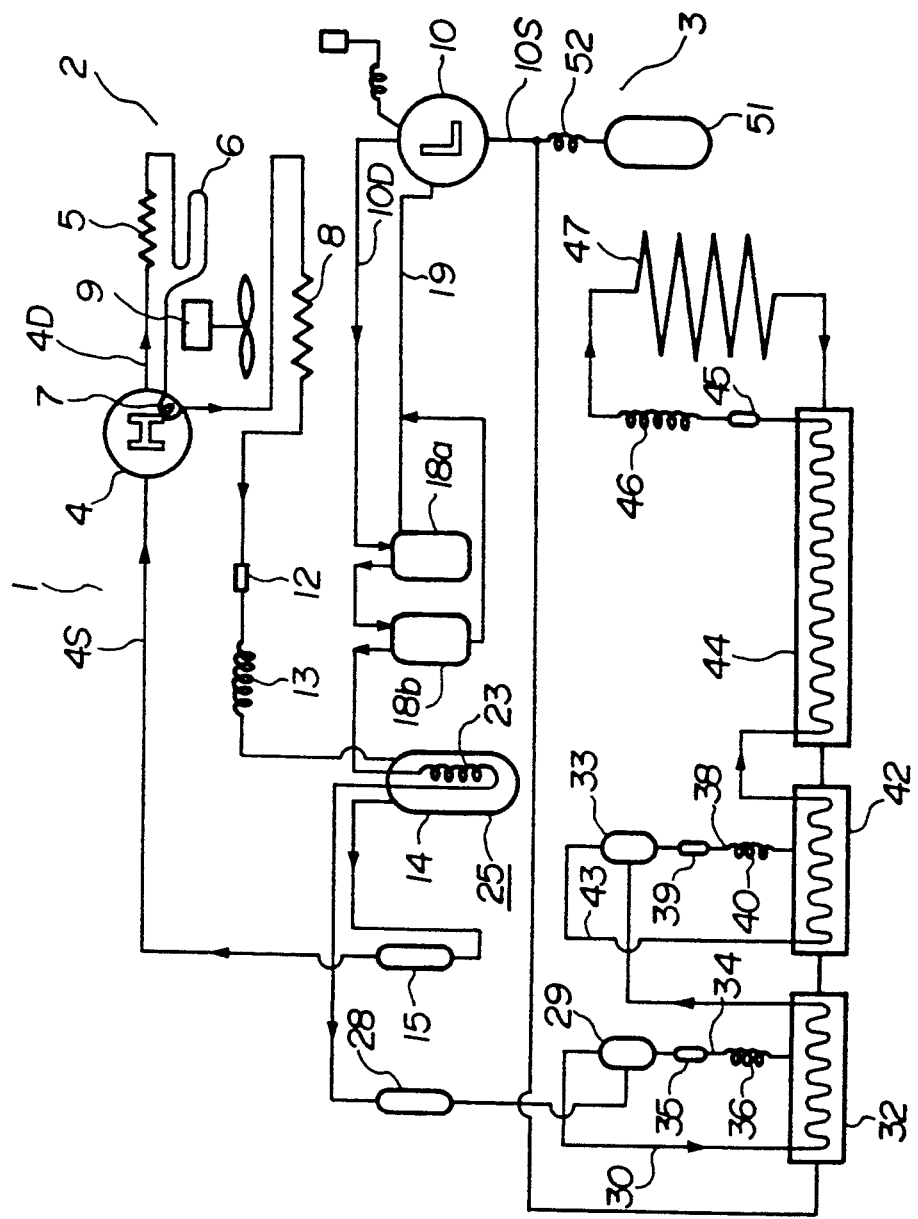
FIG. 1 is a view for showing the refrigerant circuit of the refrigerating unit according to the embodiment of the present invention.

2 . . . high temperature side refrigerant circuit
3 . . . low temperature side refrigerant circuit
4, 10 . . . electric compressor
25 . . . cascade condenser
32 . . . first intermediate thermal exchanger
42 . . . second intermediate thermal exchanger
44 . . . third intermediate thermal exchanger
47 . . . evaporation pipe

DETAILED DESCRIPTION OF THE INVENTION

The present embodiments are explained based on the drawing. FIG. 1 shows the refrigerant circuit (1) of the refrigerating unit of the present invention. The refrigerant circuit (1) comprises each independent high temperature side refrigerant circuit (2) as a first refrigerant closed-circuit and the low temperature side refrigerant circuit (3) as a second refrigerant closed-circuit.

The reference numeral (4) is an electric compressor for forming the high temperature side refrigerant circuit (2), which uses one phase or three phases AC power. A pipe (4D) in the discharging side of the electric compressor (4) is coupled to an auxiliary condenser (5) and this auxiliary condenser (5) is further coupled to a dew prevention pipe (6) for heating a opening frame of a stockroom of the refrigerator. Next, this auxiliary compressor (5) is coupled to an oil cooler (7) of the electric compressor (4) and is coupled to a condenser (8) finally. (9) is an air blower for cooling the condenser (8). The refrigerant pipe from the condenser (8) passes through a dryer (12), then passes through an evaporator (14) as the evaporator portion for forming the evaporator through a pressure reducer (13), and is coupled to an accumulator (15) as a refrigerant receiver.

The pipe from the accumulator (15) is coupled to a suction pipe (4S) of the electric compressor (4).

In the high temperature side refrigerant circuit (2), refrigerant chlorodifluoromethane (R22), 1-chloro-1, 1-difluoroethane (R142b), and dichlorofluoromethane (R21) having each different boiling point are filled, and the composition thereof is, for example, 70% by weight of R22, 25% by weight of R142b, and 5% by weight of R21.

The high temperature gaseous refrigerant discharged from the electric compressor (4) is condensed by the auxiliary condenser (5), dew prevention pipe (6), oil cooler (7) and condenser (8) and is radiated to liquefaction. Then, the water is removed by the dryer (12) and the resultant is pressure-reduced by the pressure reducer (13) and is poured into the evaporator (14) subsequently. So, the refrigerants R22 and R142b evaporate and a heat of vaporization is absorbed from circumference to cool the evaporator (14), and the resultant is fed back to the electric compressor (4) through the accumulator (15) as the refrigerant receiver.

At this time, the ability of the electric compressor (4) is, for example, 1.5HP, and the final reached temperature of the evaporator (14) during the operation is −25° C. to −35° C. In this low temperature, since R21 of the refrigerant has the boiling point of 8.95° C., R21 doses not evaporate in the evaporator (14) and remains as the liquid state. Accordingly, although this does not contribute to the refrigerating at all it has functions of performing feedback to the electric compressor (4) in the state of mixing the lubricating oil of the electric compressor and the water which can not be absorbed by the dryer (12) therein and of making the temperature of the compressor (4) low by the evaporation within the electric compressor (4) of the liquid refrigerant.

A pipe (10D) in the discharging side of the electric compressor (10) form forming the low temperature side refrigerant circuit (3) is coupled by two stages of oil separators (18a) and (18b) which are coupled in serial. An oil return pipe (19) for returning to the electric compressor (10) is coupled from the oil separators (18a) and (18b).

The refrigerant pipe from the oil separators (18a) and (18b) is coupled to a condense pipe (23) as the high pressure side pipe inserted into the evaporator (14).

The evaporator (14) and the condense pipe (23) form a cascade condenser (25).

The discharged pipe of the condense pipe (23) is coupled to a first vapor-liquid separator (29) through a dryer (28).

A vapor phase pipe (30) from the vapor-liquid separator (29) passes through a first intermediate thermal exchanger (32) and is couple to a second vapor-liquid separator (33).

A liquid phase pipe (34) from the vapor-liquid separator (29) passes through a dryer (35) and is coupled to the first intermediate thermal exchanger through a pressure reducer (36).

A liquid phase pipe (38) from the vapor-liquid separator (33) passes through a dryer (39) and is coupled to a second intermediate thermal exchanger (42) through a pressure reducer (40).

A vapor phase pipe (43) from the vapor-liquid separator (33) passes through the second intermediate thermal exchanger (42) and then passes through a third intermediate thermal exchanger (44), and is coupled to a pressure reducer (46) through a dryer (45).

The pressure reducer (46) is coupled to an evaporating pipe (47) as the evaporator and the evaporation pipe (47) is coupled to the third intermediate thermal exchanger (44).

The third intermediate thermal exchanger (44) is coupled to the second (42) and the first intermediate thermal exchanger (32) subsequently and is coupled to a suction pipe (10S) of the electric compressor (10).

Further, in the suction pipe (10S), an expansion tank (51) for storing the refrigerant when the electric compressor (10) stops, is coupled through a pressure reducer (52).

In the present invention, a mixture refrigerant having different boiling point is sealed into the low temperature side refrigerant circuit (3). Said mixture refrigerant comprises;

(a) an inorganic refrigerant selected from the group consisting of argon and nitrogen, (b) a hydrocarbon which makes (a) component liquidize, and (c) at least one refrigerant selected from the group consisting of hydrochlorofluorocarbon, hydrofluorocarbon, hydrocarbon and fluorocarbon, which makes (b) component liquidize.

Preferably, (a) component of said mixture refrigerant is argon, (b) component is methane, and (c) component is a mixture of dichlorofluoromethane, tetrafluoromethane, (d) component selected from the group consisting of chlorodifluoromethane, difluoromethane and pentafluoroethane, and (e) component which is trifluoromethane and/or hexafluoroethane.

Most preferably, the mixture refrigerant of R740 (argon), R50 (methane), R21 (dichlorofluoromethane), R14 (tetrafluoromethane), R22 (chlorodifluoromethane), and R23 (trifluoromethane) is sealed in the state of mixing previously.

The composition of each refrigerant is, for example, 12% by weight of R21, 38% by weight of R22, 16% by weight of R23, 23% by weight of R14, 5% by weight of R50, and 6% by weight of R740.

Although R50 is methane and has a danger of causing the explosion by coupling with oxygen, by mixing with each flon refrigerant with the above mentioned ratio, there is no danger of explosion. Accordingly, even if any leakage accident of the mixture refrigerant occurs, there is no possibility to cause the explosion.

Next, the reference is made to the explanation of the circulation of refrigerant in the low temperature side. In the high temperature and high voltage gaseous mixture refrigerant discharged from the electric compressor (10), the majority of the lubricating oil of the electric compressor (10) in which the refrigerant is mixed, is returned to the electric compressor (10) by the oil separators (18a) and (18b) through a oil return pipe (19). The refrigerant itself is refrigerated by the evaporator (14) in the cascade condenser (25) to condense some refrigerants (R21, R22, R23) having high boiling point in the mixture refrigerant to liquefaction.

The mixture refrigerant from the condense pipe (23) passes through the dryer (28) and is poured into the vapor-liquid separator (29). At this time, since R14, R50, and R740 in the mixture refrigerant have the extremely low boiling point, they are not condensed and are still in the vapor state. One part of R21, R22, and R23 are condensed to liquefaction, and the mixture refrigerant is separated, that is R14, R50, and R740 are to the vapor phase pipe (30) and R21, R22, and R23 are to the liquid phase pipe (34).

The mixture refrigerant poured into the vapor pipe (30) is condensed by the thermal exchange of the first intermediate thermal exchanger (32) and reaches at the vapor-liquid separator (33).

Herein, the low temperature refrigerant fed back from the evaporation pipe (47) is poured into the first intermediate thermal exchanger (32). Further, after the liquid refrigerant poured into the liquid phase pipe (34) passes through the dryer (35) and pressure-reduced by the pressure reducer (36), it is poured into the first intermediate thermal exchanger (32) and is evaporated therein, thereby contributing to the refrigerating. Accordingly, when the one part of non-condensed R14, R50, R740, and R23 was refrigerated the intermediate temperature in the first intermediate thermal exchanger (32) became −56.4° C. Accordingly, R23 in the mixture refrigerant passed through the vapor-phase pipe (30) is condensed to liquefaction perfectly and is separated by the second vapor-liquid separator (33). R14, R50, and R740 are still in the vapor state because of the low boiling point.

The water contents of R23 separated by the second vapor-liquid separator (33) is removed by the dryer (39) in the second intermediate thermal exchanger and the resultant is pressure-reduced by the pressure reducer (40). Then, it is poured into the second intermediate thermal exchanger (42) to refrigerate R14, R50, and R740 in the vapor-phase pipe (43) with the low temperature refrigerant which is fed back from the evaporation pipe (47). Thereby, R14 having highest evaporation temperature is condensed.

As a result of that, the intermediate temperature in the second intermediate thermal exchanger (42) became −84.5° C.

The vapor phase pipe (43) passing through the second intermediate thermal exchanger (42) further passes through the third intermediate thermal exchanger (44).

In the third intermediate thermal exchanger (44), the refrigerant just discharged from the evaporator (47) is fed back. According to the experiment, the intermediate temperature of the third intermediate thermal exchanger (44) became −109.8° C. and the temperature around the entrance became −151.9° C., which was relatively low temperature.

Therefore, one part of R50 and R740 in the vapor-phase pipe (43) is condensed. After one part of the liquefied R14, R50, and R740 is pressure-reduced by the pressure reducer (46), it is poured into the evaporation pipe (47), thereby refrigerating the surroundings by evaporating.

According to the experiment, the temperature of the evaporation pipe (47) became super low temperature of −153.5° C.

By arranging the above mentioned evaporation pipe (47), for example in the refrigerator, it was possible to obtain the temperature in the refrigerant of −152.4° C.

The refrigerant from the evaporation pipe (47) is poured into the third intermediate thermal exchanger (44), the second intermediate thermal exchanger (42), and the first intermediate thermal exchanger (32) subsequently, is mixed with the refrigerant evaporated in each thermal exchanger, and is fed back to the electric compressor (10) through the suction pipe (10S).

The oil mixed with the refrigerant and is discharged from the electric compressor (10) is returned to the compressor (10) by separating in the oil separator (18a), (18b). However, the mist oil discharged from the oil separators (18a) and (18b) with the refrigerant is melted into R21 and R22 which have good compatibility with the oil and is returned to the compressor (10).

Thereby, it is possible to prevent the lubricating failure and a lock of the compressor (10).

Further, R21 is fed back to the compressor (10) as it is in the liquid state and is evaporated within the compressor (10), thereby reducing the discharging temperature of the compressor (10).

The composition of each refrigerant is not restricted to the above mentioned embodiment. According to the result of experiment, as described in the claim 4. The refrigerating unit according to claim 3, when the non-azeotropic mixture refrigerant comprises 3 to 13% by weight of argon, 3 to 13% by weight of methane, 0 to 32by weight of dichlorofluoromethane, 15 to 45% by weight of tetrafluoromethane, 13 to 53% by weight of (d) component 10 to 36% by weight of (e) component, it was found to obtain the super low temperature about $31\frac{1}{8}°$ C. in the evaporation pipe (47).

Further, when the composition of 70% by weight of chlorodifluoromethane, 25% by weight of 1-chloro-1, 1-difluoroethane, and 5% by weight of octafluoropropane is added in to the non-azeotropic mixture refrigerant sealed into the high temperature side refrigerant circuit, it is also possible to obtain the same effect.

Furthermore, when R218 having the low boiling point of $-36.7°$ C. and the ratio of specific heat of 1.06 is mixed into the refrigerant circuit in the low temperature side and the high temperature side, the increment of the discharging temperature of the compressors (4) and (10) can be controlled, thereby improving the refrigerating ability. Further, it is possible to prevent the occurrence of the oil sludge and the deterioration of the oil.

Furtheranymore, in the refrigerant sealed into the low temperature side refrigerant circuit (3) as described in the claim 3, if R116 (hexafluoroethane) is added, R32 (difluoromethane) or R125 (pentafluoroethane) is sealed in stead of R22, and R116 is sealed in stead of R23, and is possible to obtain the same effect.

Yet further, by sealing the nitrogen gas into the refrigerant in the low temperature side refrigerant circuit (3), it is possible to realize the lower temperature $-160°$ C. or less. (In this case, each of the intermediate thermal exchanger, vapor-liquid separator, and pressure reducer is needed to be added one by one.)

As mentioned above, according to the present invention, it is possible to realize the super low temperature of $-150°$ C. in the final step of the evaporator by using the difference of the evaporation temperature of each refrigerant and by condensing the refrigerant which is still in the vapor-phase state by plural thermal exchangers subsequently without any usage of the refrigerant which is the object of the regulated flon. As a result of that, it can cope with the problem of the ozone layer destroy and it is possible to stabilize the preservation of the organism and the examined body for long time.

Further, by sealing dichlorofluoromethane (R21) having high boiling point (8.95° C.) and good compatibility with the oil, it is possible to return it to the compressor in the state of mixing the oil discharged into the refrigerant circuit therein. Thereby, it is possible to prevent the circulation failure of the compressor and it is possible to evaporate R21 which feeds back to the compressor in the form of liquid state within the compressor, thereby reducing the temperature of the compressor Furthermore, by sealing octafluoropropane having low boiling point of ($-36.7°$ C.) and small ratio of specific heat (1.06), it is possible to control the increment of the discharging temperature of the compressor and to improve the refrigerating ability. Further, it is possible to prevent the occurrence of the oil sludge and the deterioration of the oil.

What is claimed is:

1. A refrigerating unit comprising a high temperature side refrigerant circuit and a low temperature side refrigerant circuit for forming an independent refrigerant closed-circuit which exhibits a refrigerating effect by that a refrigerant discharged from a compressor is condensed and then is evaporated, and an evaporator of said high temperature side refrigerant circuit and a condenser of said low temperature side refrigerant circuit form a thermal exchanger, wherein a non-azeotropic mixture refrigerant comprising;

(a) an inorganic refrigerant consisting of argon and,
    (b) a hydrocarbon which makes (a) component liquidize, and
    (c) at least one refrigerant selected from the group consisting of hydrochlorofluorocarbon,, hydrofluorocarbon, hydrocarbon and fluorocarbon, which makes (b) component liquidize, is sealed into said low temperature side refrigerant circuit.

2. The refrigerating unit according to claim 1, wherein (b) component of said non-azeotropic mixture refrigerant is methane.

3. A refrigerating unit comprising a high temperature side refrigerant circuit and a low temperature side refrigerant circuit for forming an independent refrigerant closed-circuit which exhibits a refrigerating effect in that a refrigerant discharged from a compressor is condensed and then is evaporated, and an evaporator of said high temperature side refrigerant circuit and a condenser of said low temperature side refrigerant circuit form a thermal exchanger, wherein:

(a) a component of said non-azeotropic mixture refrigerant is argon,
    (b) a component of said non-azeotropic mixture refrigerant is methane which causes said argon component to liquidize,
    (c) a component of said non-azeotropic mixture refrigerant is a mixture of dichlorofluoromethane and tetrafluoromethane, which makes said methane component liquidize,
    (d) a component selected from the group consisting of chlorodifluoromethane, difluoromethane and pentafluoroethane, and
    (e) a component which is trifluoromethane and/or hexafluoroethane, are sealed into said low temperature side refrigerant circuit.

4. The refrigerating unit according to claim 3, wherein the non-azeotropic mixture refrigerant comprises 3 to 13% by weight of argon, 3 to 13% by weight of methane, 0 to 32% by weight of dichlorofluoromethane, 15 to 45% by weight of tetrafluoromethane, 13 to 53% by weight of (d) component 10 to 36% by weight of (e) component.

5. The refrigerating unit according to claim 3, wherein another no-azeotropic mixture refrigerant comprising chlorodifluoromethane, 1-chloro-1, 1-difluoroethane, and dichlorofluoromethane is sealed into said high temperature side refrigerant circuit 6. The refrigerating unit according to claim 5, wherein the non-azeotropic mixture refrigerant sealed into the high temperature side refrigerant circuit comprises 70% by weight of chlorodifluoromethane, 25% by weight of 1-chloro-1, 1-difluoroethane, and 5% by weight of dichlorofluoromethane.

7. The refrigerating unit according to claim 3, wherein another non-azeotropic mixture refrigerant comprising chlorodifluoromethane, 1-chloro-1, 1-difluoroethane, octafluoropropane is sealed into the high temperature side refrigerant circuit.

8. The refrigerating unit according to claim 7, wherein the non-azeotropic mixture refrigerant sealed into the high temperature side refrigerant circuit comprises 70% by weight of chlorodifluoromethane, 25% by weight of 1-chloro-1, 1-difluoroethane, and 5% by weight of octafluorpropane.

9. The refrigerating unit according to claim 3, wherein octafluoropropane is added to the non-azeotropic mixture refrigerant sealed into the low temperature side refrigerant circuit.

10. The refrigerating unit according to claim 3, wherein (d) component is chlorodifluoromethane.

11. The refrigerating unit according to claim 3, wherein (d) component is difluoromethane.

12. The refrigerating unit according to claim 3, wherein (d) component is pentafluoroethane.

13. The refrigerating unit according to claim 3, wherein (e) component is a mixture of trifluoromethane and hexafluoroethane.

14. The refrigerating unit according to claim 3, wherein (e) component is trifluoromethane.

15. The refrigerating unit according to claim 3, wherein (e) component is hexafluoroethane 16. The refrigerating unit according to claim wherein nitrogen is added to the non-azeotropic mixture refrigerant sealed into the low temperature side refrigerant circuit.

* * * * *

UNITED STATES PATENT AND TRADEMARK OFFICE
CERTIFICATE OF CORRECTION

PATENT NO. : 5,265,443

DATED : November 30, 1993

INVENTOR(S) : Jiro Yuzawa, et al

It is certified that error appears in the above-indentified patent and that said Letters Patent is hereby corrected as shown below:

Column 1, lines 36-37, "composition" should read --composition.--.

Column 2, line 11, "comprising" should read --comprising;--.

Column 2, line 31, "and/o" should read --and/or--.

Column 2, line 40, "1-chlor-1" should read --1-chloro-1--.

Column 4, line 39, "at all it" should read --at all, it--.

Column 7, line 25, "32by weight" should read --32% by weight--.

Column 7, line 29, "31⅛°C." should read -- -150°C.--.

Column 8, line 29, "argon and," should read --argon,--.

Column 9, line 6, "no-azeotropic" should read --non-azeotropic--.

UNITED STATES PATENT AND TRADEMARK OFFICE
CERTIFICATE OF CORRECTION

PATENT NO. : 5,265,443
DATED : November 30, 1993
INVENTOR(S) : Jiro Yuzawa, et al.

It is certified that error appears in the above-indentified patent and that said Letters Patent is hereby corrected as shown below:

Column 10, line 20, "claim wherein" should read--claim 3, wherein--.

Signed and Sealed this

Thirtieth Day of August, 1994

Attest:

Attesting Officer

BRUCE LEHMAN

Commissioner of Patents and Trademarks